(12) United States Patent
Kim

(10) Patent No.: US 12,169,011 B2
(45) Date of Patent: Dec. 17, 2024

(54) ANTI-VIBRATION MOUNT

(71) Applicant: PUKYONG NATIONAL UNIVERSITY INDUSTRY-UNIVERSITY COOPERATION FOUNDATION, Busan (KR)

(72) Inventor: Chan Jung Kim, Busan (KR)

(73) Assignee: PUKYONG NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 33 days.

(21) Appl. No.: 18/324,414

(22) Filed: May 26, 2023

(65) Prior Publication Data
US 2024/0240689 A1 Jul. 18, 2024

(30) Foreign Application Priority Data
Jan. 17, 2023 (KR) .................. 10-2023-0006858

(51) Int. Cl.
*F16F 15/02* (2006.01)
*H02K 5/24* (2006.01)
*H02K 7/18* (2006.01)

(52) U.S. Cl.
CPC ............. *F16F 15/022* (2013.01); *H02K 5/24* (2013.01); *H02K 7/1815* (2013.01)

(58) Field of Classification Search
CPC .................................. F16F 15/022; H02K 5/24
USPC .................................................. 248/562, 638
See application file for complete search history.

(56) References Cited

U.S. PATENT DOCUMENTS

| 11,708,936 B2 * | 7/2023 | Mayinger | ............. F16F 15/022 |
| | | | 248/550 |
| 2022/0316550 A1 * | 10/2022 | Jang | ........................ F16F 3/04 |

FOREIGN PATENT DOCUMENTS

KR 20-0197539 Y1 9/2000

* cited by examiner

*Primary Examiner* — Todd M Epps
(74) *Attorney, Agent, or Firm* — Knobbe, Martens, Olson & Bear, LLP

(57) ABSTRACT

An anti-vibration mount is proposed. The anti-vibration mount may include an upper mount including a first spring and a first damper configured to support a power generation facility from a bottom of the power generation facility that generates electricity. One end of each of the first spring and the first damper may be connected to the power generation facility, and an opposite end of each of the first spring and the first damper may be connected to a mass block that is a mass body. A lower mount provided with a second spring and a second damper to support the mass block from a bottom of the mass block. One end of each of the second spring and the second damper may be connected to the mass block that is the mass body.

5 Claims, 4 Drawing Sheets

ANTI-VIBRATION MOUNT

CROSS REFERENCE TO RELATED APPLICATION

The present application claims priority to Korean Patent Application No. 10-2023-0006858, filed Jan. 17, 2023, the entire contents of which is incorporated herein for all purposes by this reference.

BACKGROUND

Technical Field

The present disclosure relates to an anti-vibration mount and, more particularly, to an anti-vibration mount capable of effectively reducing vibration transmitted from power generation a facility.

Description of Related Technology

In general, when a support object such as a generator is installed, vibration and shock generated from the support object as well as live and dead loads may occur during use, thereby damaging the generator, so an anti-vibration device is used to continuously maintain the function of the device in spite of such an action.

SUMMARY

One aspect is an anti-vibration mount that can respond to excitation conditions in two different directions.

Another aspect is an anti-vibration mount, the mount including: an upper mount provided with a first spring and a first damper provided to support a power generation facility from a bottom of the power generation facility that generates electricity, wherein one end of each of the first spring and the first damper is connected to the power generation facility, and an opposite end of each of the first spring and the first damper is connected to a mass block that is a mass body; and a lower mount provided with a second spring and a second damper to support the mass block from a bottom of the mass block, wherein one end of each of the second spring and the second damper is connected to the mass block that is the mass body, wherein the upper mount reduces a vibration generated from the power generation facility, and the lower mount reduces a vibration induced from a floor.

The lower mount may be configured to reduce the vibration induced from the floor by increasing or decreasing stiffness of the second spring and damping of the second damper.

The lower mount may be configured to increase stiffness of the second spring and reduce damping of the second damper to reduce the vibration induced from the floor.

The anti-vibration mount may have theoretical frequency response functions drawn as Equations 1 and 2 below:

$$\frac{X_B(s)}{F_p(s)} = H_{X_B} = \frac{(sC_M + K_M)(sC_p + K_p)}{\alpha(s)\beta(s)\gamma(s) - \alpha(s)(sC_M + K_M)^2 - \gamma(s)(sC_p + K_p)^2}; \quad \text{Equation 1}$$

and $$\frac{X_p(s)}{F_p(s)} = H_{X_p} = \frac{\beta(s)\gamma(s) - (sC_M + K_M)^2}{\alpha(s)\beta(s)\gamma(s) - \alpha(s)(sC_M + K_M)^2 - \gamma(s)(sC_p + K_p)^2}, \quad \text{Equation 2}$$

wherein $M_M$ is the mass block, $K_p$ is a first spring stiffness coefficient, $C_p$ is a first damper damping coefficient, $M_B$ is the base building mass block, $K_M$ is a second spring stiffness coefficient, $C_M$ is a second damper damping coefficient, $F_p(F_B=0)$ is a power generation facility input, $X_p$ is a power generation facility response, $X_B$ is a base building response, $F_B$ is an excitation, $X_B$ is a power generation facility response, and $K_B$ is a virtual spring coefficient.

A vibration transmission rate from the power generation facility downward may be obtained as Equation 4 below, and a vibration transmission rate from the bottom to the top may be obtained as Equation 5 below:

$$I_1(s) = \frac{X_B(s)}{X_p(s)} = \frac{H_{X_B}}{H_{X_p}} = \frac{(sC_M + K_M)(sC_p + K_p)}{\beta(s)\gamma(s) - (sC_M + K_M)^2}; \text{ and} \quad \text{Equation 4}$$

$$I_2(s) = \frac{X_p(s)}{X_B(s)} = \frac{\gamma(s)(sC_p + K_p)}{\alpha(s)(sC_M + K_M)}, \quad \text{Equation 5}$$

wherein $I_1$ is a performance index related to an anti-vibration, $I_2$ is a performance index for a floor input, $X_p$ is the generation facility response, $X_B$ is the power generation facility response, $\alpha(s)$, $\beta(s)$, $\gamma(s)$ are variables, and $C_M$ is the second damper damping coefficient, $K_M$ is the second spring stiffness coefficient, $K_p$ is the first spring stiffness coefficient, $C_p$ is the first damper damping coefficient.

As described above, the anti-vibration mount according to the present disclosure has the following effects.

First, an anti-vibration mount capable of responding to excitation conditions in two different directions is designed, whereby the capability thereof to respond to the excitation conditions in an opposite direction can be strengthened by mitigating the anti-vibration performance that relatively has a margin up to an acceptable condition.

Second, it is possible to design the anti-vibration mount capable of responding even to the excitation condition caused on the floor, and thus to provide an anti-vibration mount with an excellent anti-vibration effect.

BRIEF DESCRIPTION OF THE DRAWINGS

The above and other objectives, features, and other advantages of the present disclosure will be more clearly understood from the following detailed description when taken in conjunction with the accompanying drawings.

DETAILED DESCRIPTION

An anti-vibration device protects the device or facility by absorbing or reducing the vibration while supporting the load of the device or facility when various devices or facilities that generate vibration are installed on the floor or other support, wherein a buffer material such as a spring capable of absorbing energy is mainly applied thereto.

Korean Utility Model Registration No. 20-0197539 discloses an anti-vibration spring mount. However, because of being made by using a fastening method of bolts and nuts, the spring mount of the related art is configured to be necessary to be adjusted according to the characteristics of the support device, so there is a problem that the vibration reduction effect is not excellent.

In addition, the above anti-vibration device has a problem in that it does not effectively reduce transmission to the supporting system when an excitation (basement input) occurs on the floor due to an abnormal event such as an earthquake and the like under design conditions (stiffness and damping).

Embodiments described below are provided so that those skilled in the art can easily understand the technical idea of the present disclosure, and the present disclosure is not limited thereto. In addition, matters represented in the accompanying drawings are schematically illustrated to easily explain the embodiments of the present disclosure and may be different from the forms actually implemented.

It should be understood that when a component is referred to as being connected or linked to another component, it may be directly connected or linked to another component, but other components may exist in the middle.

Figure 1:
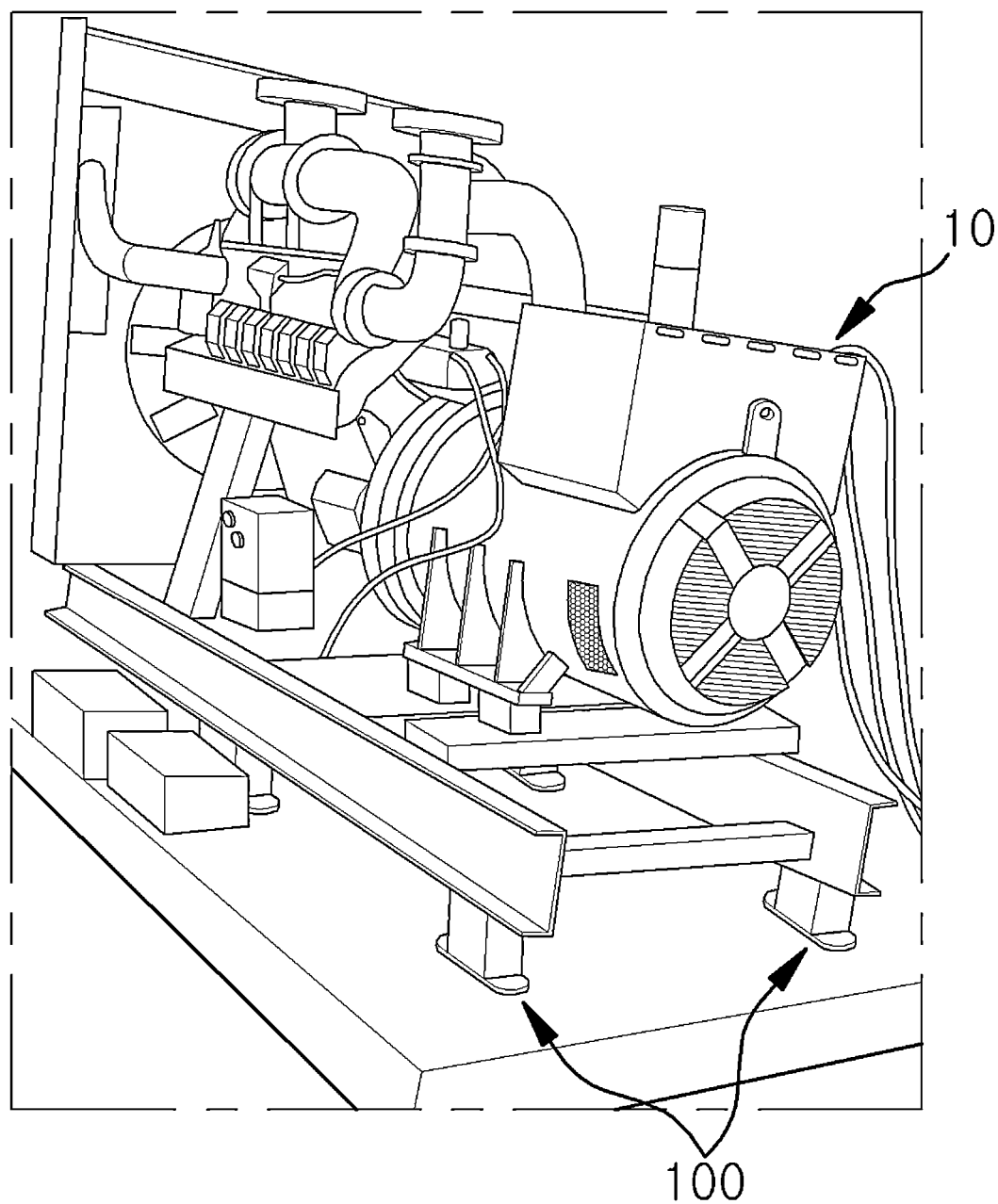
FIG. 1 is a mimetic diagram of an electricity generation facility that an anti-vibration mount according to an embodiment of the present disclosure supports.
Figure 2:
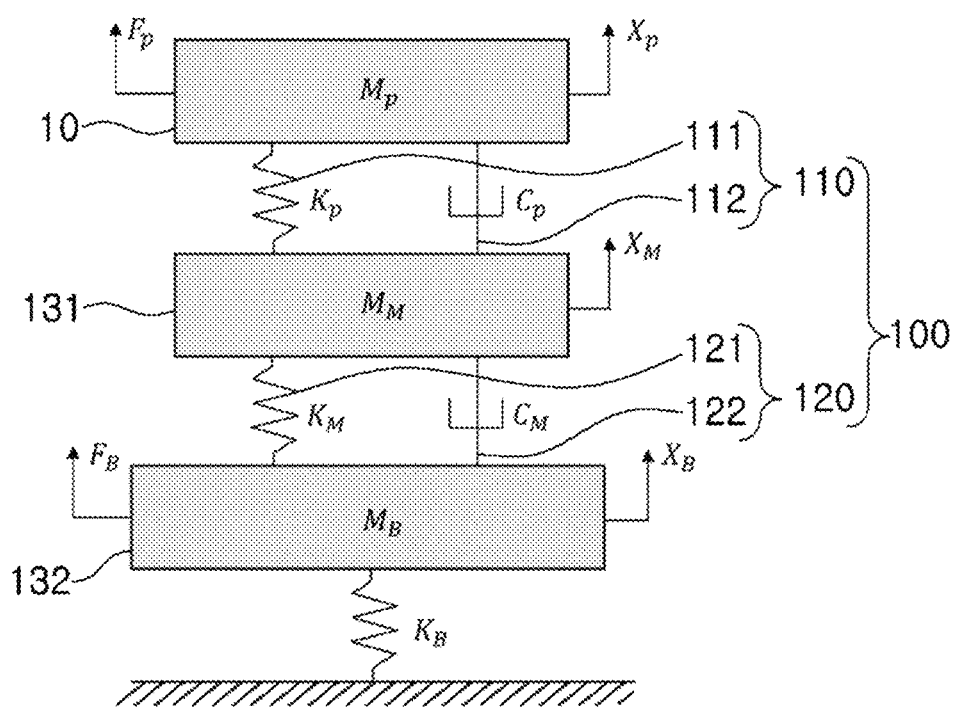
FIG. 2 is a mimetic diagram showing a 3-degree-of-freedom model of the anti-vibration mount according to the embodiment of the present disclosure.
Figure 3A:
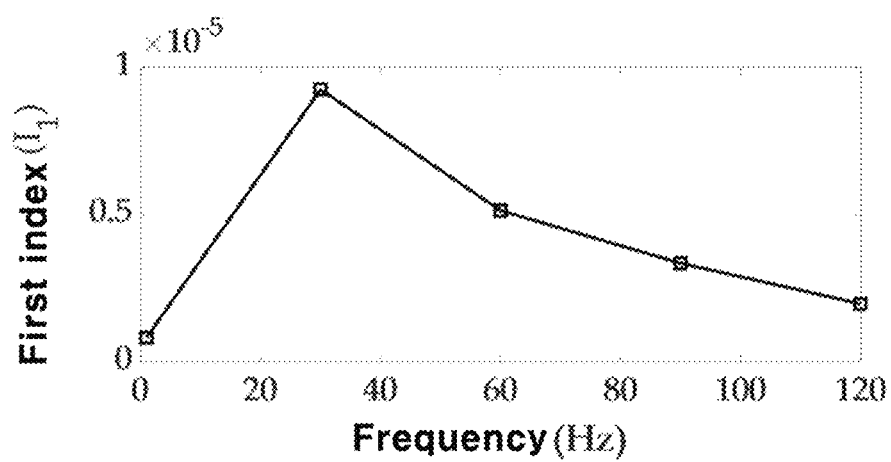
FIGS. 3A and 3B are graphs showing respective results for index 1 and index 2 in the anti-vibration mount according to the embodiment of the present disclosure.
Figure 3B:
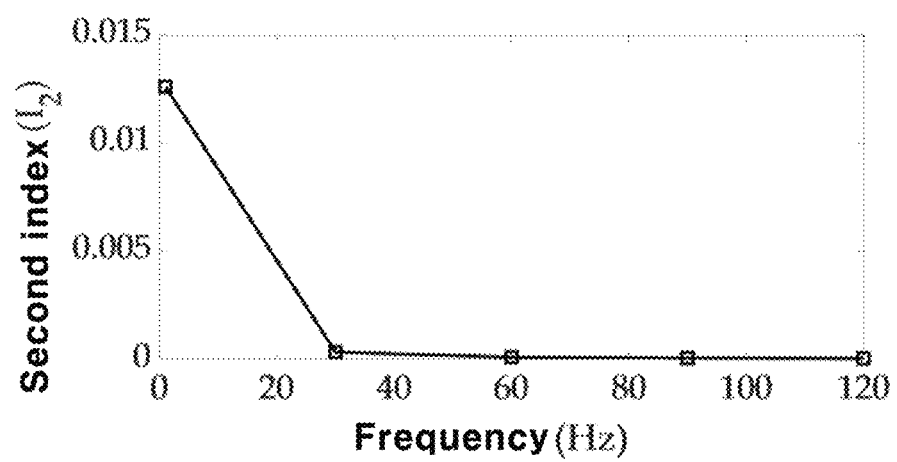

FIG. 1 is a mimetic diagram of an electricity generation facility that an anti-vibration mount according to an embodiment of the present disclosure supports, FIG. 2 is a mimetic diagram showing a 3-degree-of-freedom model of the anti-vibration mount according to the embodiment of the present disclosure, and FIGS. 3A and 3B are graphs showing respective results for index 1 and index 2 in the anti-vibration mount according to the embodiment of the present disclosure.

With reference to FIGS. 1 and 3 together, the anti-vibration mount according to the embodiment of the present disclosure includes an upper mount 110 and a lower mount 120, wherein a plurality of anti-vibration mounts is configured to support the power generation facility 10 at corner parts of the power generation facility 10, respectively.

The anti-vibration mount 100 according to the present disclosure may further include an outer housing configured to accommodate and protect the upper mount 110 and the lower mount 120.

According to the present disclosure, the upper mount 110 configured to directly support the power generation facility 10 at the bottom of the power generation facility 10 generating electricity in the anti-vibration mount 100 includes a first spring 111 having a first stiffness coefficient $K_p$ and a first damper 112 having a first damping coefficient $C_p$.

For the upper mount 110, one upper end of the first spring 111 having the first stiffness coefficient $K_p$ and one upper end of the first damper 112 having the first damping coefficient $C_p$ are connected to the power generation facility 10, and a lower opposite end of the first spring 111 having the first stiffness coefficient $K_p$ and a lower opposite end of the first damper 112 having the first damping coefficient $C_p$ are connected to the mass block 131 or Mb, a mass body.

The lower mount 120 includes a second spring 121 having a second stiffness coefficient $K_M$ and a second damper 122 having a second damping coefficient $C_M$.

The lower mount 120 is connected to a lower part of the upper mount 110, wherein the lower mount 120 includes the second spring 121 and a second damper 122 so as to support the mass block 131 from a lower part, and one end of each of the second spring 121 and the second damper 122 is connected to the mass block 131, the mass body. That is, the mass block 131 is located between the upper mount 110 and the lower mount 120, wherein the upper mount 110 is connected to the upper side of the mass block 131, and the lower mount 120 is connected to the lower side of the mass block 131.

In addition, an opposite end of each of the second spring 121 and the second damper 122 is connected to the base building mass block 132 or Mb of a lower side. Here, a lower part of the base building mass block Mb is connected to a virtual spring factor $K_B$, and a lower end of the virtual spring factor $K_B$ is connected to the ground surface.

For the vibration generation reduction of the upper mount 110 and the lower mount 120, both two kinds of mounts may be used. However, rather than changing the upper mount 110 that directly supports the upper power generation facility 10 to a new type, it is limited to the selection of the lower mount 120 and is shown in FIG. 2 in a 3-degree-of-freedom modeling.

On the basis of the model of FIG. 2, the theoretical frequency response function is drawn as Equations 1 and 2 below. Here, the variables ($\alpha(s)$, $\beta(s)$, and $\gamma(s)$) used for simplification are shown in Equations 3-1 to 3-3.

$$\frac{X_B(s)}{F_p(s)} = H_{X_B} = \frac{(sC_M + K_M)(sC_p + K_p)}{\alpha(s)\beta(s)\gamma(s) - \alpha(s)(sC_M + K_M)^2 - \gamma(s)(sC_p + K_p)^2} \quad \text{Equation 1}$$

$$\frac{X_p(s)}{F_p(s)} = H_{X_p} = \frac{\beta(s)\gamma(s) - (sC_M + K_M)^2}{\alpha(s)\beta(s)\gamma(s) - \alpha(s)(sC_M + K_M)^2 - \gamma(s)(sC_p + K_p)^2} \quad \text{Equation 2}$$

wherein $M_M$ is the mass block, $K_p$ is a first spring stiffness coefficient, $C_p$ is a first damper damping coefficient, $M_B$ is a base building mass block, $K_M$ is a second spring stiffness coefficient, $C_M$ is a second damper damping coefficient, $F_p(F_B=0)$ is a power generation facility input, $X_p$ is a power generation facility response, $X_B$ is a base building response, $F_B$ is an excitation, $X_B$ is a power generation facility response, and $K_B$ is a virtual spring coefficient.

$$\alpha(s) = s^2 M_p + sC_p + K_p \quad \text{Equation 3-1}$$

$$\beta(s) = s^2 M_M + s(C_p + C_M) + (K_p + K_M) \quad \text{Equation 3-2}$$

$$\alpha(s) = s^2 M_p + sC_p + K_p \quad \text{Equation 3-1}$$

Using Equations 1 and 2, the transmittance of vibration to the floor in a state in which the force $F_p$ generated by the power generation facility 10 exists is as shown in Equation 4 and is defined as a performance index 1 $I_1$ related to an anti-vibration. On the contrary to this, the input upward from the floor due to an earthquake or the like is transmitted to the power generation facility 10 by being affected by the floor displacement in a state $F_p=F_M=0$ in which the external force does not exist, so Equation 5 is defined as a performance index 2 $I_2$ for a floor input.

$$I_1(s) = \frac{X_B(s)}{X_p(s)} = \frac{H_{X_B}}{H_{X_p}} = \frac{(sC_M + K_M)(sC_p + K_p)}{\beta(s)\gamma(s) - (sC_M + K_M)^2} \quad \text{Equation 4}$$

$$I_2(s) = \frac{X_p(s)}{X_B(s)} = \frac{\gamma(s)(sC_p + K_p)}{\alpha(s)(sC_M + K_M)} \quad \text{Equation 5}$$

A simulation is performed under the conditions of Table 1 below, and the results of the derived two indices for the frequency band of 1 Hz to 120 Hz are shown in FIGS. 3A and 3B, respectively.

TABLE 1

3 degree-of-freedom-model specifications for simulation

| Variable | Value |
| --- | --- |
| $M_p$(kg) | 6070 kg |
| $M_M$(kg) | 6,900 kg |
| $M_B$(kg) | $10 \times M_p$ |
| $K_p$(kN/m) | 940 (1 Hz), 1050 (30 Hz), 1245 (60 Hz), 1881 (90 Hz), 4399 (120 Hz) |
| $K_M$(kN/m) | $(5 \times 10^6) \times K_p$ |
| $K_B$(kN/m) | $10^{-1} \times K_p$ |
| $C_p$(Ns/m) | 603 (1 Hz), 376 (30 Hz), 216 (60 Hz), 184 (90 Hz), 158 (120 Hz) |
| $C_M$(Ns/m) | $(1.5 \times 10^6) * C_p$ |

The smaller the values of the indices, the better the anti-vibration performance, wherein the index 1 shows a lower value in the frequency band of interest than the index 2. The index 1 is a performance that prevents vibration from being transmitted to the floor when a load is generated in the generator of a power generation facility that generates electricity, and the index 2 is a concept of the transfer rate for the floor input to the power generation facility, so the discharge performance with respect to the floor input falls behind, relatively. In [Table 2], four conditions are selected in order to know the change of the two indices through the design change of the lower mount 120. That is, the lower mount 120 is expressed by the coefficients and of the second spring 121 and the second damper 122, respectively, so the four conditions that may be adjusted by increasing or decreasing the corresponding values 10 times are calculated.

TABLE 2

Four conditions for lower anti-vibration mount modification

| Case | Value |
| --- | --- |
| I | $C_M \div 10$, $K_M \div 10$ |
| II | $C_M \div 10$, $K_M \times 10$ |
| III | $C_M \times 10$, $K_M \div 10$ |
| IV | $C_M \times 10$, $K_M \times 10$ |

Tables 3 and 4 below show changes in performance indices in each region of the frequency of interest for the corresponding condition as a relative error (on the basis of Table 1).

TABLE 3

Simulation results for four conditions for index 1

| | Ratio of first performance index $I_1$ | | | | |
| --- | --- | --- | --- | --- | --- |
| Case | 1 Hz | 30 Hz | 60 Hz | 90 Hz | 120 Hz |
| I | — | 3.2 | 1.6 | 1.4 | 1.6 |
| II | — | 3.2 | 1.7 | 1.5 | 1.6 |
| III | — | 3.2 | 1.6 | 1.4 | 1.6 |
| IV | — | 3.2 | 1.6 | 1.4 | 1.6 |

TABLE 4

Simulation results for four conditions for index 2

| | Ratio of second performance index $I_2$ | | | | |
| --- | --- | --- | --- | --- | --- |
| Case | 1 Hz | 30 Hz | 60 Hz | 90 Hz | 120 Hz |
| I | 1.3 | 1.0 | 1.2 | 1.5 | 2.0 |
| II | 1.3 | 0.9 | 0.9 | 0.8 | 0.8 |
| III | 1.3 | 1.0 | 1.0 | 1.0 | 1.0 |
| IV | 1.3 | 1.0 | 1.0 | 1.0 | 1.0 |

Here, it may be seen from the tables above that Case $I_1$ contributes to a decrease in the value of the index 2 while to an increase in the value of the index 1, at the same time. In the existing mounting condition, the anti-vibration performance in which the vibration is transmitted from the top to the bottom satisfies a predetermined acceptance criterion, so the increase in the value of the index 1 is within an allowable range. Therefore, an anti-vibration mount modification plan in case II may improve the performance of the floor input through a design change.

Therefore, the anti-vibration mount according to the present disclosure may be designed to be able to respond to the excitation conditions of two different directions, one condition of a downward direction vibration and another condition of a vibration in a direction from the bottom to the top, of the power generation facility, whereby the capability thereof to respond to the excitation conditions in an opposite direction may be strengthened by mitigating the anti-vibration performance that relatively has a margin up to an acceptable condition. In addition, it is possible to design an anti-vibration mount capable of responding even to the excitation condition caused on the floor and thus provide an anti-vibration mount with an excellent anti-vibration effect.

Those skilled in the art to which the present disclosure pertains will understand that the present disclosure may be embodied in other specific forms without changing the technical spirit or essential features thereof. Therefore, the embodiments described above are merely selected among various possible embodiments and presented to the most exemplary embodiments to help those skilled in the art to understand, and the technical spirit of the present disclosure is not necessarily restricted or limited only by the presented embodiments. In addition, it should be noted that various changes, additions, and modifications are possible within a range that does not deviate from the technical spirit of the present disclosure, and other equivalent embodiments are possible.

What is claimed is:

1. An anti-vibration mount, the mount comprising:
   an upper mount comprising a first spring and a first damper configured to support a power generation facility from a bottom of the power generation facility that generates electricity, wherein one end of each of the first spring and the first damper is connected to the power generation facility, and an opposite end of each of the first spring and the first damper is connected to a mass block that is a mass body; and a lower mount comprising a second spring and a second damper to support the mass block from a bottom of the mass block, wherein one end of each of the second spring and the second damper is connected to the mass block that is the mass body, wherein the upper mount is configured to reduce a vibration generated from the power generation facility, and wherein the lower mount is configured to reduce a vibration induced from a floor.

2. The mount of claim 1, wherein the lower mount is configured to reduce the vibration induced from the floor by increasing or decreasing stiffness of the second spring and damping of the second damper.

3. The mount of claim 2, wherein the lower mount is configured to increase stiffness of the second spring and reduce damping of the second damper to reduce the vibration induced from the floor.

4. The mount of claim 1, wherein the anti-vibration mount has theoretical frequency response functions drawn as Equations 1 and 2 below:

$$\frac{X_B(s)}{F_p(s)} = H_{X_B} = \qquad \text{Equation 1}$$

$$\frac{(sC_M + K_M)(sC_p + K_p)}{\alpha(s)\beta(s)\gamma(s) - \alpha(s)(sC_M + K_M)^2 - \gamma(s)(sC_p + K_p)^2};$$

and $$\frac{X_p(s)}{F_p(s)} = H_{X_p} = \qquad \text{Equation 2}$$

-continued $$\frac{\beta(s)\gamma(s) - (sC_M + K_M)^2}{\alpha(s)\beta(s)\gamma(s) - \alpha(s)(sC_M + K_M)^2 - \gamma(s)(sC_p + K_p)^2},$$

wherein $M_M$ is the mass block, $K_p$ is a first spring stiffness coefficient, $C_p$ is a first damper damping coefficient, $M_B$ is the base building mass block, $K_M$ is a second spring stiffness coefficient, $C_M$ is a second damper damping coefficient, $F_p(F_B=0)$ is a power generation facility input, $X_p$ is a power generation facility response, $X_B$ is a base building response, $F_B$ is an excitation, $X_B$ is a power generation facility response, and $K_B$ is a virtual spring coefficient.

5. The mount of claim 4, wherein a vibration transmission rate from the power generation facility downward is obtained as Equation 4 below, and a vibration transmission rate from the bottom to the top is obtained as Equation 5 below:

$$I_1(s) = \frac{X_B(s)}{X_p(s)} = \frac{H_{X_B}}{H_{X_p}} = \frac{(sC_M + K_M)(sC_p + K_p)}{\beta(s)\gamma(s) - (sC_M + K_M)^2}; \qquad \text{Equation 4}$$

and $$I_2(s) = \frac{X_p(s)}{X_B(s)} = \frac{\gamma(s)(sC_p + K_p)}{\alpha(s)(sC_M + K_M)}, \qquad \text{Equation 5}$$

wherein $I_1$ is a performance index related to an anti-vibration, $I_2$ is a performance index for a floor input, $X_p$ is the generation facility response, $X_B$ is the power generation facility response, $\alpha(s)$, $\beta(s)$, $\gamma(s)$ are variables, $C_M$ and is the second damper damping coefficient, $K_M$ is the second spring stiffness coefficient, $K_p$ is the first spring stiffness coefficient, $C_p$ is the first damper damping coefficient.

* * * * *

UNITED STATES PATENT AND TRADEMARK OFFICE
CERTIFICATE OF CORRECTION

PATENT NO. : 12,169,011 B2
APPLICATION NO. : 18/324414
DATED : December 17, 2024
INVENTOR(S) : Chan Jung Kim Page 1 of 1

It is certified that error appears in the above-identified patent and that said Letters Patent is hereby corrected as shown below:

In the Specification

In Column 5, Line 25, in TABLE 1, delete "$C_N(Ns/m)$" and insert --$C_M(Ns/m)$--.

In Column 5, Line 39, delete "coefficients and" and insert --coefficients $K_M$ and $C_M$--.

Signed and Sealed this
Eleventh Day of February, 2025

Coke Morgan Stewart
*Acting Director of the United States Patent and Trademark Office*